(12) United States Patent
Kapoor

(10) Patent No.: US 11,474,819 B1
(45) Date of Patent: Oct. 18, 2022

(54) UNIFIED VIEW, ANALYTICS, AND AUDITABILITY FOR SOFTWARE DEVELOPMENT PROCESSES SPANNING DISTINCT SOFTWARE DEVELOPMENT APPLICATIONS

(71) Applicant: Digital.ai Software, Inc., Burlington, MA (US)

(72) Inventor: Rahul Kapoor, Bellevue, WA (US)

(73) Assignee: Digital.ai Software, Inc., Burlington, MA (US)

( * ) Notice: Subject to any disclaimer, the term of this patent is extended or adjusted under 35 U.S.C. 154(b) by 49 days.

(21) Appl. No.: 17/327,579

(22) Filed: May 21, 2021

(51) Int. Cl.
| | |
|---|---|
| *G06F 8/77* | (2018.01) |
| *G06F 8/10* | (2018.01) |
| *G06Q 10/06* | (2012.01) |
| *G06F 16/25* | (2019.01) |
| *G06F 16/21* | (2019.01) |

(52) U.S. Cl.
CPC ............... *G06F 8/77* (2013.01); *G06F 8/10* (2013.01); *G06F 16/219* (2019.01); *G06F 16/254* (2019.01); *G06Q 10/0637* (2013.01)

(58) Field of Classification Search
CPC .................................................. G06F 8/77
See application file for complete search history.

(56) References Cited

U.S. PATENT DOCUMENTS

| | | | | |
|---|---|---|---|---|
| 8,698,835 | B1* | 4/2014 | Shiplacoff | G06F 3/0482 345/589 |
| 8,863,074 | B2* | 10/2014 | Trent | G06F 9/44526 717/104 |
| 10,198,250 | B1* | 2/2019 | Sharma | G06F 9/5033 |
| 2007/0130561 | A1* | 6/2007 | Siddaramappa | G06F 11/3604 717/106 |
| 2014/0282227 | A1* | 9/2014 | Nixon | G06F 9/44505 715/786 |
| 2015/0199197 | A1* | 7/2015 | Maes | G06F 8/65 717/122 |
| 2017/0177466 | A1* | 6/2017 | Owen | G06F 11/3688 |

\* cited by examiner

*Primary Examiner* — Jae U Jeon
(74) *Attorney, Agent, or Firm* — Rahman LLC

(57) ABSTRACT

A method of generation of a unified view of a software development process that spans a plurality of distinct software development applications having distinct software models is provided. The method includes enhancing a software development application selected as primary to provide the unified view of the software development process, or alternatively using a data warehouse to provide the unified view of the software development process via reports and dashboards created based on a unified software model. The method provides end to end visibility, auditability, and support for calculation of one or more flow metrics, not only for the software development process, but also for a set of stages, individual stages and sub-stages of the software development process. The method also provides an ability to relate the one or more flow metrics to business outcomes.

22 Claims, 10 Drawing Sheets

| Project Item | Priority Level | Owner | Estimated Time | Sub-stage | Specs | | | | Secured | Unit Tested ☒ Link<br>Regular Tested ☒<br>Functional Tests Link<br>Performance Tests Link<br>Security Tests Link | Released ☒<br>Links to Releases | Deployed<br>☒ Links to Logs & Monitoring Reports |
|---|---|---|---|---|---|---|---|---|---|---|---|---|
| | | | | | Requirement Specs | Functional Specs | High Level Design | Detail Design | | | | |
| 1 | | | | | | | | | ☐ | | | |

UPDATING A UNIFIED SOFTWARE MODEL CAPTURING AN END TO END SOFTWARE DEVELOPMENT PROCESS WITH UPDATES OBTAINED FROM THE DISTINCT SOFTWARE MODELS OF THE PLURALITY OF DISTINCT SOFTWARE DEVELOPMENT APPLICATIONS ASSOCIATED WITH DIFFERENT STAGES OF THE SOFTWARE DEVELOPMENT PROCESS

702

DETERMINING A CORRELATION BETWEEN A PLURALITY OF SOFTWARE MODEL ENTITIES OF THE PLURALITY OF DISTINCT SOFTWARE MODELS OF THE PLURALITY OF DISTINCT SOFTWARE DEVELOPMENT APPLICATIONS THAT ARE RELATED, BASED ON USE OF COMMON IDENTIFIERS ASSOCIATED WITH THE SOFTWARE MODEL ENTITIES, WHEREIN THE IDENTIFIERS ARE CORRELATED TO CAPTURE (A) A FLOW OF THE SOFTWARE DEVELOPMENT PROCESS AND (B) HIERARCHICAL RELATIONSHIPS BETWEEN THE SOFTWARE MODEL ENTITIES

704

TRACKING AN ENTRY AND AN EXIT FROM EACH STAGE AND A SUB-STAGE OF THE SOFTWARE DEVELOPMENT PROCESS BY ASSIGNING A TIME-STAMP TO EACH UPDATE OF THE PLURALITY OF SOFTWARE MODEL ENTITIES THAT IS TRIGGERED IN ANY OF THE PLURALITY OF DISTINCT SOFTWARE DEVELOPMENT APPLICATIONS

706

UNIFIED VIEW, ANALYTICS, AND AUDITABILITY FOR SOFTWARE DEVELOPMENT PROCESSES SPANNING DISTINCT SOFTWARE DEVELOPMENT APPLICATIONS

BACKGROUND

Technical Field

The embodiments herein generally relate to techniques for generating a unified view of a software development process that spans distinct software development applications that have distinct software models.

Description of the Related Art

In a software development process, there are several different tools used for different stages, for example, a word processor such as Microsoft Word™ may be used in conjunction with a document repository such as Microsoft SharePoint™ for requirements, functional specification, high level design and detail design. A project planning tool such as Microsoft Project™ or Digital.ai Agility™ may be used for work item enumeration, estimates and project plans. Integrated development environments such as Microsoft Visual Studio™ or Eclipse™ may be used for coding, and tools such as Bitbucket™ and Microsoft Team Foundation Server™ may be used for code management. Tools such as Junit™ or NUnit™ may be used for unit testing, a tool such as Digital.ai Application Protection™ may be used for securing code, a tool such as SonarQube™ may be used for security testing, a tool such as Selenium may be used for test automation, a tool such as Digital.ai Release™ may be used for release management and deployment, and a tool such as AWS Cloud Watch™, Azure Monitor and Log Analytics™ or Google Cloud Monitoring and Logging™ may be used for monitoring hosted software. Additionally, depending on the tool used, some of the main stages may have mini workflows captured by sub-stages, for example Open(Ed), InProgress, Resolved, Closed, Cancelled and Reopened.

With multiple tools being used in the software development process, information is spread across the tools, so visibility, auditability, and observability of the end to end process is a challenge, which is a technical drawback. Further, it's also difficult to calculate metrics and key performance indicators that capture aspects of the software flow that require data from multiple tools and raise alerts when values of such metrics suggest attention is required. Since Business and Operational value streams are even further disconnected from the software tools used for building the software for the different business stages, relating business outcomes to software being developed is even harder.

A possible solution to the aforementioned problems is to create a single tool which handles all software stages, eliminates the need for gathering and correlating information from different tools, thus minimizing all the problems inherent with the use of multiple tools. Though several software development tools have been expanding the software stages they support over the years, currently no single tool exists which supports all stages. Also, large enterprises tend to use best of breed tools and may end up with multiple tools due to a decentralized tool selection process, whereby separate teams responsible for different areas of software development make their own tool selection. For enterprises that utilize multiple tools for the software development process, there is a need for mechanisms to provide end to end visibility, auditability, and support for calculation of flow metrics, not only for the complete process, but also for a set of stages, individual stages and sub-stages, as well as the ability to relate those metrics to business outcomes.

Accordingly, there arises a need to address the aforementioned technical drawbacks in existing technologies for generation of a unified view of a software development process that spans a plurality of distinct software development applications.

SUMMARY

In view of the foregoing, there is provided one or more non-transitory computer readable storage medium storing a sequence of instructions, which when executed by a processor, causes generation of a unified view of a software development process that spans a plurality of distinct software development applications having distinct software models, the sequence of instructions include (a) updating a unified software model capturing an end to end software development process with updates obtained from the distinct software models of the plurality of distinct software development applications associated with different stages of the software development process; (b) determining a correlation between a plurality of software model entities of the plurality of distinct software models of the plurality of distinct software development applications that are related, based on use of common identifiers associated with the software model entities, wherein the identifiers are correlated to capture (i) a flow of the software development process, and (ii) hierarchical relationships between the software model entities; (c) tracking an entry and an exit from each stage and a sub-stage of the software development process by assigning a time-stamp to each update of the plurality of software model entities that is triggered in any of the plurality of distinct software development applications; (d) computing a plurality of software development flow metrics for (i) the end-to-end software development process, (ii) an individual stage of the software development process, (iii) a set of stages of the software development process, or (iv) a sub-stage or a set of sub-stages of the software development process; (e) mapping, for computation of a subset of the plurality of software development flow metrics, a set of sub-stages of the software development process to a single sub-stage based on a sub-stage reduction map; and (f) generating the unified view of the software development process that is based on the unified software model and outputting the plurality of software development flow metrics on an electronic display screen.

In some embodiments, the non-transitory computer readable storage medium storing the sequence of instructions, which when executed by the processor, further causes aligning the unified software model and the plurality of distinct software development applications to capture updates of the plurality of software model entities associated with the plurality of distinct software development applications based on at least one of a webhook system, a push of updates from the plurality of distinct software development applications or a pull of updates from the plurality of distinct software development applications. The updates are of the plurality of software model entities of the distinct software models associated with the plurality of distinct software development applications.

In some embodiments, the non-transitory computer readable storage medium storing the sequence of instructions, which when executed by the processor, further causes extracting the identifier of the plurality of software model entities from a text attribute associated with the plurality of software model entities using a text analysis method.

In some embodiments, the non-transitory computer readable storage medium storing the sequence of instructions of any of the preceding claims, which when executed by the processor, further causes customizing a start and an end for a subset of the plurality of software development flow metrics, wherein the start and the end is a stage or a sub-stage of the software development process.

In some embodiments, the non-transitory computer readable storage medium storing the sequence of instructions, which when executed by the processor, further causes augmenting a user interface of a software development application used for the software development process, with the unified view of the software development process that is generated based on the unified software model. Augmenting the user interface provides a unified view of the software development process in a primary tool of the software development process.

In some embodiments, the non-transitory computer readable storage medium storing the sequence of instructions, which when executed by the processor, further causes (a) storing historical and current data associated with the unified software model in a data warehouse, and (b) displaying the unified view of the software development process via reports or dashboards created based on data in the data warehouse.

In some embodiments, the non-transitory computer readable storage medium storing the sequence of instructions, which when executed by the processor, further causes determining a dimensional correlation between the stages of the software development process and a plurality of dimensions of the plurality of software model entities that includes at least one of a temporal dimension, a progress dimension, an ownership dimension, a priority dimension or a software flow stage dimension.

In some embodiments, the non-transitory computer readable storage medium storing the sequence of instructions, which when executed by the processor, further causes analysis of the plurality of software development flow metrics based on the plurality of dimensions.

In some embodiments, the non-transitory computer readable storage medium storing the sequence of instructions, which when executed by the processor, further causes maintaining of a map between the software development process against business outcomes and a plurality of business stages, to support scoping the plurality of software development flow metrics to business outcomes and the plurality of business stages.

In some embodiments, the non-transitory computer readable storage medium storing the sequence of instructions, which when executed by the processor, further causes generating at least one audit trail for tracking activities that span across different stages of the software development process.

In another aspect, there is provided a software development device that causes generation of a unified view of a software development process that spans a plurality of distinct software development applications having distinct software models, the device includes a processor and a memory that stores a set of instructions, which when executed by the processor, performs the steps of (a) updating a unified software model capturing an end to end software development process with updates obtained from the distinct software models of the plurality of distinct software development applications associated with different stages of the software development process; (b) determining a correlation between a plurality of software model entities of the plurality of distinct software models of the plurality of distinct software development applications that are related, based on use of common identifiers associated with the software model entities, wherein the identifiers are correlated to capture (i) a flow of the software development process, and (ii) hierarchical relationships between the software model entities; (c) tracking an entry and an exit from each stage and a sub-stage of the software development process by assigning a time-stamp to each update of the plurality of software model entities that is triggered in any of the plurality of distinct software development applications; (d) computing a plurality of software development flow metrics for (i) the end-to-end software development process, (ii) an individual stage of the software development process, (iii) a set of stages of the software development process, or (iv) a sub-stage or a set of sub-stages of the software development process; (e) mapping, for computation of a subset of the plurality of software development flow metrics, a set of sub-stages of the software development process to a single sub-stage based on a sub-stage reduction map; and (f) generating the unified view of the software development process that is based on the unified software model and outputting the plurality of software development flow metrics on an electronic display screen.

In some embodiments, the software development device aligns the unified software model and the plurality of distinct software development applications to capture updates of the plurality of software model entities associated with the plurality of distinct software development applications based on at least one of a webhook system, a push of updates from the plurality of distinct software development applications or a pull of updates from the plurality of distinct software development applications. The updates are of the plurality of software model entities of the distinct software models associated with the plurality of distinct software development applications.

In some embodiments, the software development device customizes a start and an end for a subset of the plurality of software development flow metrics, wherein the start and the end are a stage or a sub-stage of the software development process.

In some embodiments, the software development device augments a user interface of a software development application used for the software development process, with the unified view of the software development process that is generated based on the unified software model.

In some embodiments, the software development device stores historical and current data associated with the unified software model in a data warehouse and displays the unified view of the software development process via reports or dashboards created based on data in the data warehouse.

In some embodiments, the software development device determines a dimensional correlation between the stages of the software development process and a plurality of dimensions of the plurality of software model entities that includes at least one of a temporal dimension, a progress dimension, an ownership dimension, a priority dimension or a software flow stage dimension.

In some embodiments, the software development device causes analysis of the plurality of software development flow metrics based on the plurality of dimensions.

In some embodiments, the software development device maintains a map between the software development process against business outcomes and a plurality of business stages, to enable scoping the plurality of software development flow metrics to business outcomes and the plurality of business stages.

In some embodiments, the software development device generates at least one audit trail for tracking activities that span across different stages of the software development process.

In yet another aspect, an embodiment herein provides a method of generation of a unified view of a software development process that spans a plurality of distinct software development applications having distinct software models. The method includes (a) updating a unified software model capturing an end to end software development process with updates obtained from the distinct software models of the plurality of distinct software development applications associated with different stages of the software development process; (b) determining a correlation between a plurality of software model entities of the plurality of distinct software models of the plurality of distinct software development applications that are related, based on use of common identifiers associated with the software model entities, wherein the identifiers are correlated to capture (i) a flow of the software development process, and (ii) hierarchical relationships between the software model entities; (c) tracking an entry and an exit from each stage and a sub-stage of the software development process by assigning a time-stamp to each update of the plurality of software model entities that is triggered in any of the plurality of distinct software development applications; (d) computing a plurality of software development flow metrics for (i) the end-to-end software development process, (ii) an individual stage of the software development process, (iii) a set of stages of the software development process, or (iv) a sub-stage or a set of sub-stages of the software development process; (e) mapping, for computation of a subset of the plurality of software development flow metrics, a set of sub-stages of the software development process to a single sub-stage based on a sub-stage reduction map; and (f) generating the unified view of the software development process that is based on the unified software model and outputting the plurality of software development flow metrics on an electronic display screen.

The method provides visibility, auditability, and observability of an end to end software development process. The method may relate the software development process to business outcomes and stages, which is not possible with traditional tools. The method provides analytics for a) the end to end software development process, b) individual stages, c) set of stages, as well as d) sub-stages via flow metrics, and relating of those metrics to business outcomes. The method provides auditability for the end to end software development process, individual stages, set of stages, or sub-stages. The method provides the unified view of the end to end software development process for further analysis.

In some embodiments, the method further includes aligning the unified software model and the plurality of distinct software development applications to capture updates of the plurality of software model entities associated with the plurality of distinct software development applications based on at least one of a webhook system, a push of updates from the plurality of distinct software development applications or a pull of updates from the plurality of distinct software development applications. The updates are of the plurality of software model entities of the distinct software models associated with the plurality of distinct software development applications.

In some embodiments, the method further includes extracting the identifier of the plurality of software model entities from a text attribute associated with the plurality of software model entities using a text analysis method.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 is an exemplary screenshot of a client device of FIG. 1 that illustrates the unified view of the software development process, according to some embodiments herein;

FIGS. 7A and 7B are flow diagrams of a method for generation of a unified view of a software development process that spans a plurality of distinct software development applications having distinct software models, according to some embodiments herein;

DETAILED DESCRIPTION

Figure 1:
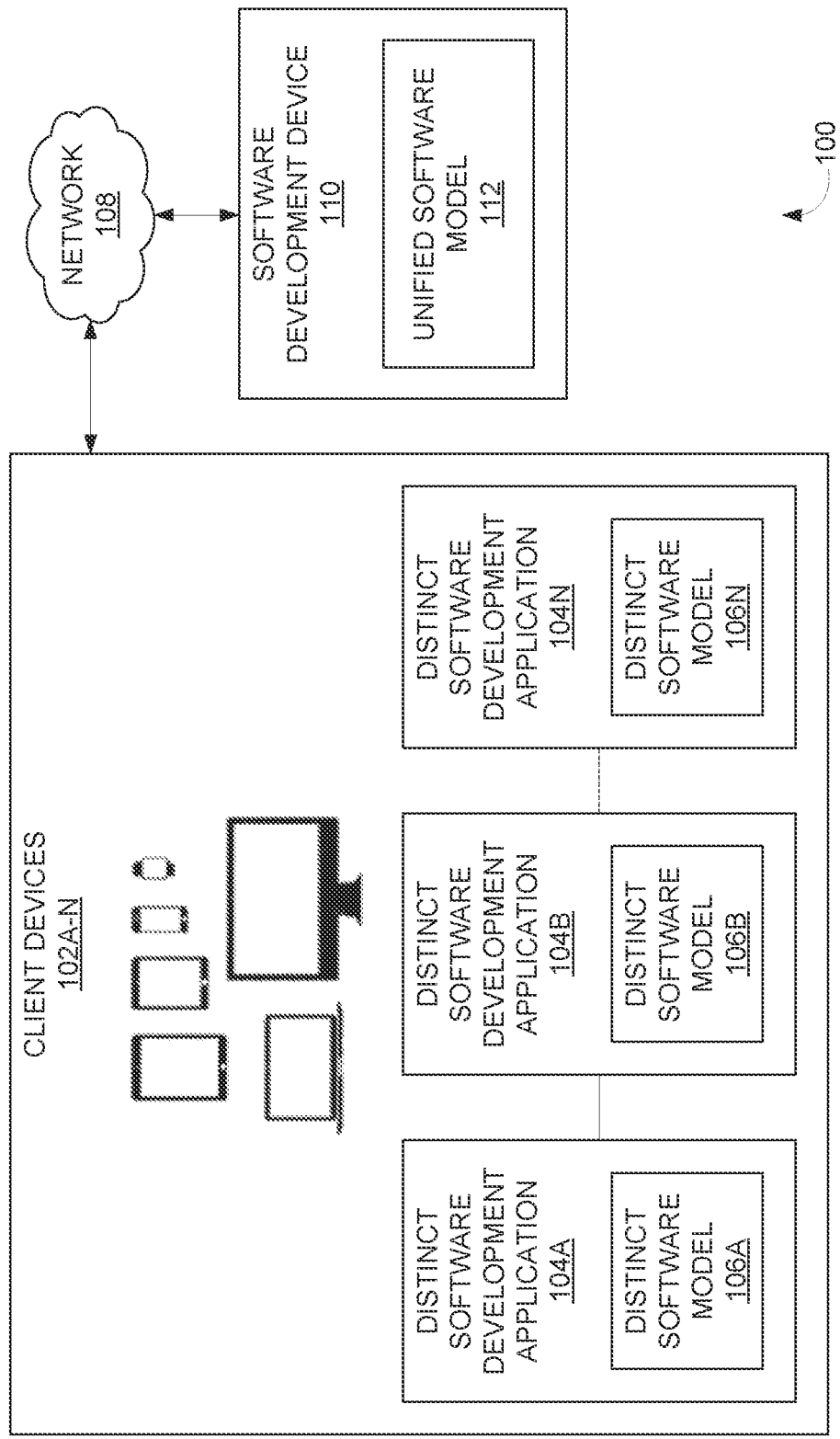
FIG. 1 illustrates a system for generation of a unified view of a software development process that spans a plurality of distinct software development applications having distinct software models, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for generation of a unified view of a software development process that spans a plurality of distinct software development applications having distinct software models. Referring now to the drawings, and more particularly to FIGS. 1 to 9, where similar reference characters denote corresponding features consistently throughout the figures, there are shown preferred embodiments.

As used herein the term "software development application", also referred to as a "tool", is a computer program that software developers use to create, debug, maintain, or otherwise support other programs and applications. Software development application may refer to programs that may be combined together to accomplish a task of a software development process. The software development process is a process of conceiving, specifying, designing, programming, documenting, testing, and bug fixing involved in creating and maintaining applications, frameworks, or other software components. The software development process may involve writing and maintaining a source code, but in a broader sense, includes all that is involved between conception of a desired software through to final manifestation of the software. The software development process may comprise a plurality of stages including (a) a requirements gathering stage for meeting a company vision, business goals and needs of a customer of the software, (b) a high level functional specification stage, (c) a high level design stage, (d) an enumeration of major work-items stage, (e) estimates for work-items and project plan stage, (f) a detail design stage, (g) a refinement of estimates and project plan stage, (h) a coding for work-items stage, (i) a unit testing stage, (j) a check-in and build stage including support for both periodic or continuous builds, (k) a securing of code stage, (l) an end to end testing stage that may include security testing, functional testing, performance testing, stress testing, where test cases are typically designed and developed in parallel with the software, (m) a release stage, (n) a configuration and deployment stage that may include support for hosted environments for development, test, staging and production, and (o) an operation and monitoring stage.

FIG. 1 illustrates a system 100 for generation of a unified view of the software development process that spans a plurality of distinct software development applications 104A-N (where N is a positive integer) having a plurality of distinct software models 106A-N (where N is a positive integer), according to some embodiments herein. The system 100 includes one or more client devices 102A-N (where N is a positive integer) that comprise the plurality of distinct software development applications 104A-N having one or more distinct software models 106A-N. The plurality of distinct software development applications 104A-N may include a project management tool, a document repository, a document processing tool, a code and build repository, an integrated development environment, a code securing tool, a security testing tool, a unit testing tool, a test automation tool, a release tool, a configure and deploy tool or a monitoring tool.

The one or more client devices 102A-N are connected via a network 108 to a software development device 110 that comprises the unified software model 112. The software development device 110, which may be a computer, may be configured to update the unified software model 112, capturing an end to end software development process with updates obtained from the one or more distinct software models 106A-N of the plurality of distinct software development applications 104A-N that are associated with different stages of the software development process. The software development device 110 may determine a correlation between a plurality of software model entities of the plurality of distinct software models 106A-N of the plurality of distinct software development applications 104A-N that are related, based on use of common identifiers associated with the software model entities.

The identifiers may be correlated to capture (a) a flow of the software development process, and (b) hierarchical relationships between the software model entities. The software development device 110 may track an entry and an exit from each stage and a sub-stage of the software development process by assigning a time-stamp to each update of the plurality of software model entities that is triggered in any of the plurality of distinct software development applications 104A-N.

The software development device 110 may compute a plurality of software development flow metrics for (a) the end-to-end software development process, (b) an individual stage of the software development process, (c) a set of stages of the software development process, or (d) a sub-stage or a set of sub-stages of the software development process. The software development device 110 may map a set of sub-stages of the software development process to a single sub-stage based on a sub-stage reduction map. The software development device 110 may map the set of sub-stages of the software development process for computation of a subset of the plurality of software development flow metrics. The software development device 110 may generate the unified view of the software development process that is based on the unified software model 112. In some embodiments, the software development device 110 may be configured to output the plurality of software development flow metrics on an electronic display screen.

Figure 2:
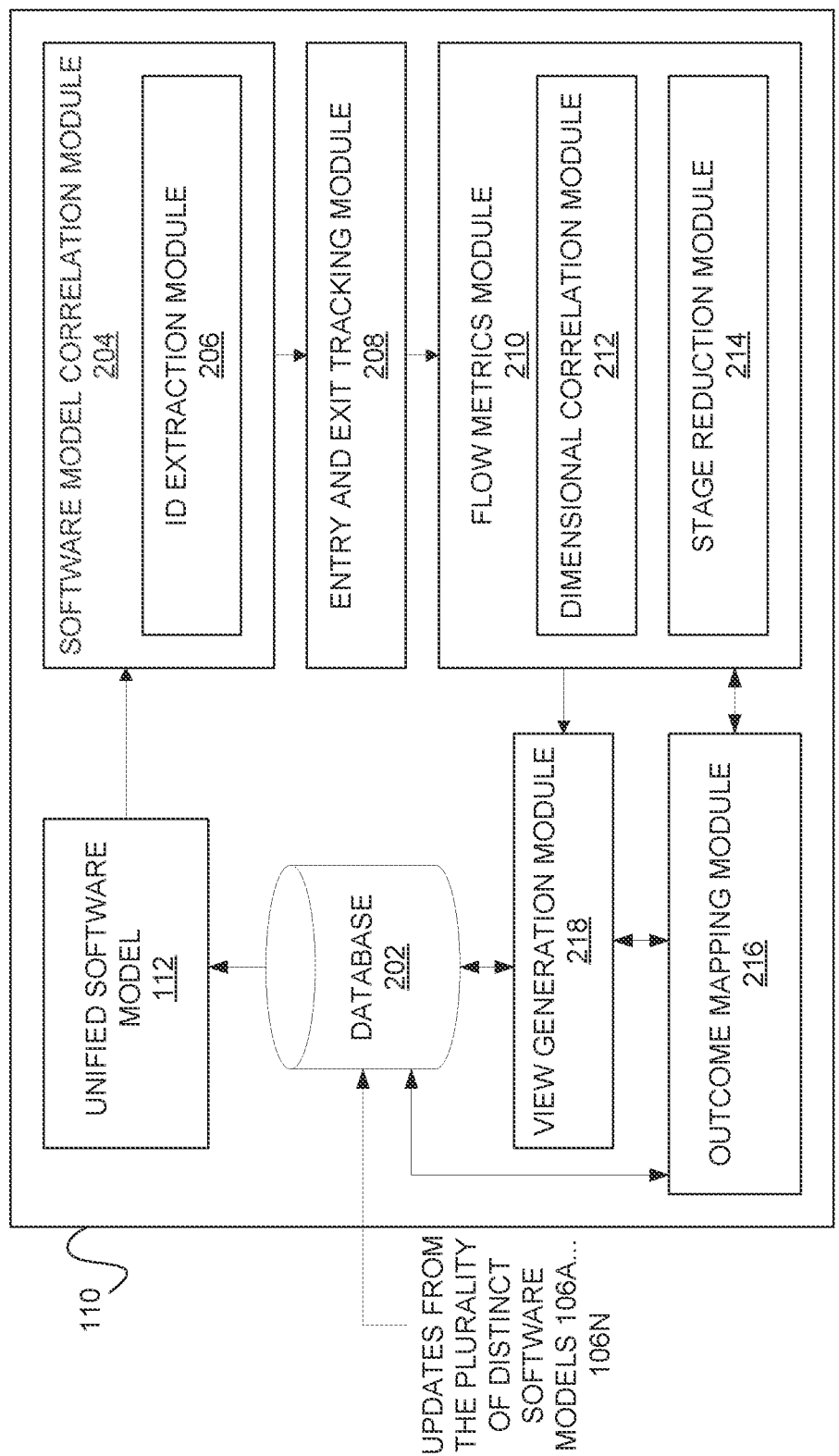
FIG. 2 illustrates an exploded view of a software development device of FIG. 1, according to some embodiments herein.

FIG. 2 illustrates an exploded view of the software development device 110 of FIG. 1, according to some embodiments herein. The software development device 110 includes a database 202 that is connected to the unified software model 112, a software model correlation module 204, which includes an ID extraction module 208. An entry and exit tracking module 208 is also provided along with a flow metrics module 210 including a dimensional correlation module 212 and a stage reduction module 214, an outcome mapping module 216, and a view generation module 218. The database 202 obtains updates from the plurality of distinct software models 106A-N of the plurality of distinct software development applications 104A-N associated with different stages of the software development process. Using the updates from the plurality of distinct software models 106A-N, the unified software model 112 is updated for capturing the end-to-end software development process.

The software model correlation module 204 may determine a correlation between a plurality of software model entities of the plurality of distinct software models 106A-N of the plurality of distinct software development applications 104A-N that are related, based on use of common identifiers associated with the software model entities. The identifiers may be correlated to capture (a) a flow of the software development process, and (b) hierarchical relationships between the software model entities. The ID extraction module 206 may extract the identifier of the plurality of software model entities from a text attribute associated with the plurality of software model entities using a text analysis method such as entity extraction or regular expression based pattern matching.

The entry and exit tracking module 208 may track an entry and an exit from each stage and a sub-stage of the software development process by assigning a time-stamp to each update of the plurality of software model entities that is triggered in any of the plurality of distinct software development applications 104A-N.

The software development device 110 provides an end to end correlation of the software development process that allows for computation of a plurality of software development flow metrics with a granular stage and sub-stage level data allowing for further analysis. The flow metrics module 210 may compute the plurality of software development flow metrics for (a) the end-to-end software development process, (b) an individual stage of the software development process, (c) a set of stages of the software development process, or (d) a sub-stage or a set of sub-stages of the software development process. Some possible software development flow metrics are described in the table below.

analyzed by stage, over time, by a combination of stage and time, or by sub-stages as indicated by Y (Yes) or NA (Not Applicable) in the table above. Temporal flow metrics require stage entry/exit timestamps, ownership flow metrics require info on user/group assigned to a flow item, progress flow metrics require tracking of updates to flow items, and priority flow metrics require priority associated with a flow item.

To enable the end to end correlation between the plurality of software model entities of the plurality of distinct software models 106A-N of the plurality of distinct software development applications 104A-N, an ID chaining mechanism may be used. The ID chaining mechanism includes linking identifiers across the plurality of distinct software development applications 104A-N and is generated by referencing identifiers in structured fields or text fields of the plurality of distinct software models 106A-N. The ID chaining mechanism is described in FIG. 3.

Again, with respect to FIG. 2, the dimensional correlation module 212 may determine a dimensional correlation between the stages of the software development process and

| Metric | Comments | By sub-stage | By stage, over time, By stage over time |
|---|---|---|---|
| Basic | | | |
| i) Count and % of different flow items | Distribution metric | Y | Y |
| ii) Count of Active items and Active vs. Resolved flow items | Active items indicate current Load, Requires sub-stage reduction map. | NA | Y |
| iii) Count and % of ReOpened items | Customer satisfaction indicator, Requires ReOpened sub-stage. | NA | Y |
| iv) Count and % of Cancelled items | Requires Cancelled sub-stage. | NA | Y |
| v) Count and % of Unapproved items | Requires approval tracking | Y | Y |
| vi) Count and % of Blocked items | Requires blocked tracking | Y | Y |
| vii) Count and % of Completed items | Throughput/Velocity metric | NA | Y |
| viii) Releases secured | | NA | NA |
| ix) Defects leaked by release | Leak = unresolved defects | NA | NA |
| Temporal (requires stage entry/exit timestamps) | | | |
| x) Time between flow item stages (requires Start and End definition) with Min/max/average | Ex. 'Requirement to Deployment', 'Release to Deployment' etc. | NA | Y |
| xi) Count and % of SLA breaches | SLA = Service Level Agreement SLA | NA | Y |
| xii) Wait times, Ratio of Active vs. Wait time | Inefficiencies | NA | Y |
| xiii) Release frequency | | NA | NA |
| Ownership (requires user/group info) | | | |
| xiv) Flow items assigned to user/group | Load by user/group | Y | Y |
| xv) Flow items opened/completed by user/group | Contribution's metric | NA | Y |
| xvi) Reassignment Frequency | In same sub-stage | Y | Y |
| Progress (requires tracking updates to items) | | | |
| xvii) Count and % of inactive flow items | Lack of updates => inactive | Y | Y |
| Priority (requires priority info) | | | |
| xviii) Count and % of items in each priority class | | Y | Y |

Not all stages may be associated with all flow items and only certain software development flow metrics may be a plurality of dimensions of the plurality of software model entities that includes at least one of a temporal dimension, a progress dimension, an ownership dimension, a priority dimension or a software flow stage dimension. The flow metrics module 210 may perform analysis of the plurality of software development flow metrics based on the plurality of dimensions.

The stage reduction module 214 may map a set of sub-stages of the software development process to a single sub-stage based on a sub-stage reduction map. The sub-stage reduction map may collapse a set of sub-stages to a smaller set. For example, for certain software development flow metrics, an active versus resolved status may be selected when the distinct software development application 104A has several sub-stages such as "Open(ed)", "InProgress", "Resolved", "Closed", "Cancelled", and "ReOpened" in which case a sub-stage reduction map would map (Open (ed), InProgress, ReOpened) to "Active" and (Resolved, Closed, Cancelled) to "Closed". The stage reduction module 214 may map the set of sub-stages of the software development process for computation of a subset of the plurality of software development flow metrics.

In some embodiments, the flow metrics module 210 may be configured to customize a start and an end for a subset of the plurality of software development flow metrics. The start and the end are a stage or a sub-stage of the software development process. For example, a start for a feature could be "Requirement creation" or start of "High Level Design", while the end of the feature could be "Test" or "Deploy". The start and the end may be specific to some metrics, for example, for "Developer Bug Fix Time" metric, the start may be from a point of time when it is "Assigned" (sub-stage), with the end being the point of time when it is "Resolved" (sub-stage), while for a "Customer Bug Turnaround Time" metric, the start may be from the point of time when it is "reported" (Opened sub-stage) with the end being when it is deployed in a "Release". The flexibility of defining the start and the end allows for a mechanism to customize stages that get included in the computation of flow metrics.

The view generation module 218 may generate the unified view of the software development process that is based on the unified software model 112.

The outcome mapping module 216 may maintain a map between the software development process against business outcomes and a plurality of business stages. The map may be maintained to support scoping the plurality of software development flow metrics to business outcomes and the plurality of business stages. The map may be populated manually unless an organization associated with the software development process is already tracking the mappings using a value stream mapping tool.

In some embodiments, the software development device 110 may be configured to output the plurality of software development flow metrics on an electronic display screen that may be associated with a distinct software development application 104A. Optionally, the distinct software development application 104A may be a project management application or a primary software tool of the software development process.

In some embodiments, the unified software model 112 and the plurality of distinct software development applications 104A-N may be aligned to capture updates of the plurality of software model entities that are associated with the plurality of distinct software development applications 104A-N. The unified software model 112 and the plurality of distinct software development applications 104A-N may be aligned based on at least one of a webhook system, a push of updates from the plurality of distinct software development applications 104A-N or a pull of updates from the plurality of distinct software development applications 104A-N. The updates are of the plurality of software model entities of the distinct software models 106A-N associated with the plurality of distinct software development applications 104A-N. The updates occur when data or metadata associated with the plurality of software model entities of the distinct software models 106A-N gets updated, upon which corresponding elements of the unified model 112 are updated. Metadata updates may require updates to mappings of the distinct software models 106A-N to the unified model, while the data updates just update the corresponding data in the unified model.

The webhook system may be a generalized webhook system (such as described in U.S. patent application Ser. No. 17/105,499, the complete disclosure of which, in its entirety, is herein incorporated by reference) that may be configured to register a hypertext transfer protocol (HTTP) message subscription associated with (a) an event that occurs on the publishing web-application, and (b) an HTTP message of the publishing web-application sent to the subscriber web-application at the event. The generalized webhook system may be configured to transform the HTTP message using the HTTP Message subscription associated with the event for generating transformed HTTP message. The HTTP message subscription is created by: (i) generating an extended web URL by augmenting a web URL associated with the HTTP message subscription with an HTTP method identifier, (ii) transforming a payload associated with the HTTP message from a format of the publishing web-application to a format of the subscriber web-application using payload mapping, and (iii) transforming the extended web URL by appending a variable with the payload, the variable includes identifier information associated with a data entity. The generalized webhook system may be configured to deliver the transformed HTTP message from the publishing web-application to the subscriber web-application to invoke an application programming interface (API) for synchronization of the publishing web-application and the subscriber web-application. In some embodiments, the data entity may include, but not be limited to, a text, an audio, a video, a web URL, a data structure, and a data-table. The HTTP method identifier is an identifier of a set of request methods that indicate a desired action to be performed for a given web URL. The HTTP method identifier may include, but not be limited to, "GET", "HEAD POST", "PUT", "DELETE", "CONNECT", "OPTIONS", "TRACE", and "PATCH".

FIG. 3 is an exemplary screenshot of a client device 102A of FIG. 1 that illustrates the unified view 300 of the software development process according to some embodiments herein. The unified view 300 includes various project items that have a unique identifier. Each project item includes the following associated information: (a) a project item name, (b) a priority, (c) an owner, (d) an estimate, (e) a sub-stage, (f) links to requirement specification, functional specification, high level design and detail design, (g) a flag indicating if the item has been secured, (h) flags to indicate if unit testing and regular testing has been performed for the item, and links to functional tests, performance tests and security tests, (i) a flag to indicate if the item has been released and links to releases the item is in, and (j) a flag to indicate if the item has been deployed and links to logs and monitoring information applicable to the item.

Figure 4:
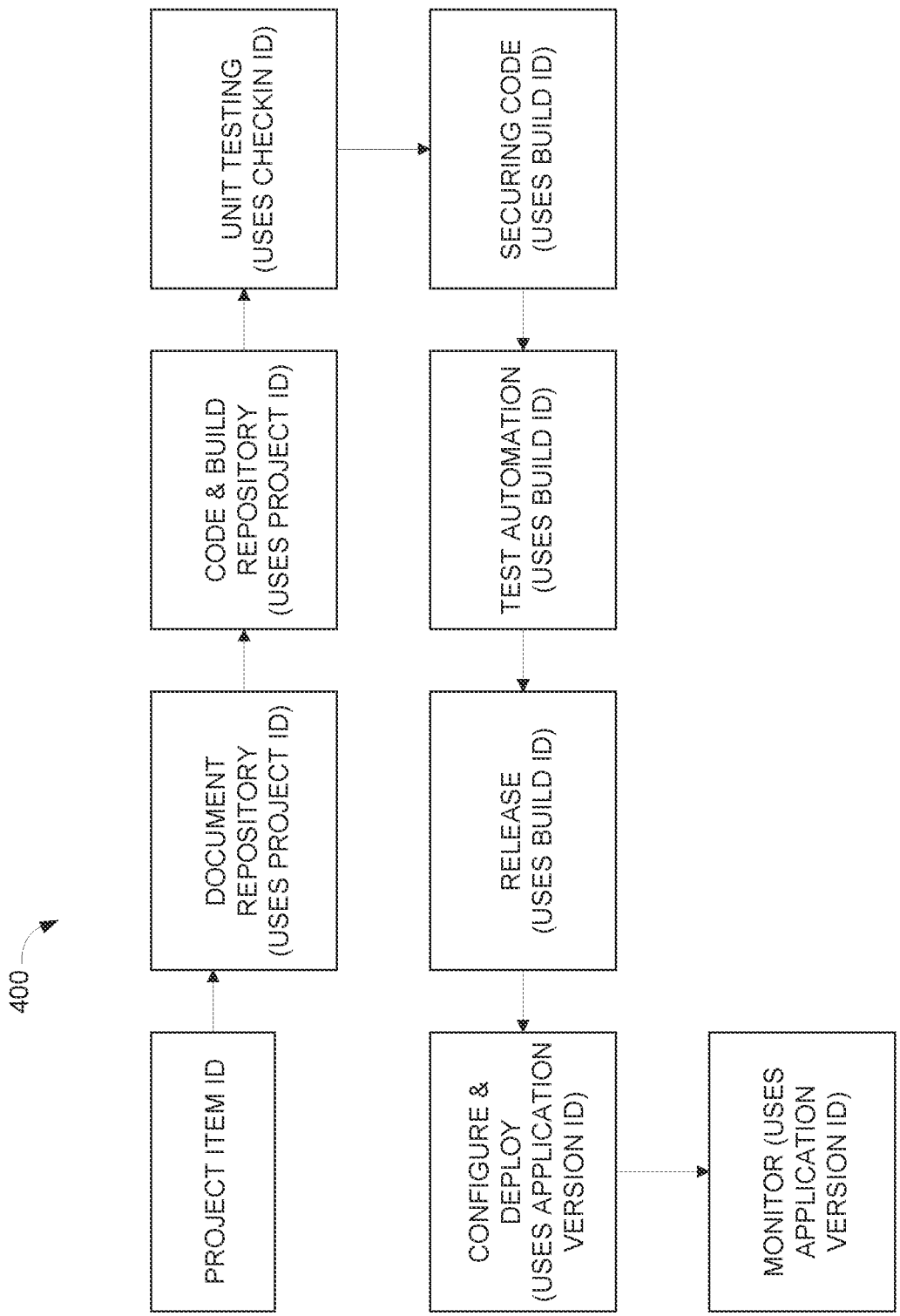
FIG. 4 illustrates an ID chaining mechanism using a chain of linked identifiers for enabling an end to end correlation between a plurality of software model entities of the plurality of distinct software models of the plurality of distinct software development applications, according to some embodiments herein.

FIG. 4 illustrates the ID chaining mechanism using a chain of linked identifiers 400 for enabling the end to end correlation between the plurality of software model entities of the plurality of distinct software models 106A-N of the plurality of distinct software development applications 104A-N according to some embodiments herein. The ID chaining mechanism includes the chain of linked identifiers 400 that has identifiers that are linked across the plurality of distinct software development applications 104A-N. The chain of linked identifiers 400 may be generated and used by referencing identifiers in structured fields or text fields of the plurality of distinct software models 106A-N. For example, a project management tool may have an identifier that is referenced during a code check-in via a structured field that is required to be populated with the identifier of a project that the code check-in is for. In the absence of a structured field, the identifier may be mentioned as part of a text comment during code check-in. The identifier may be extracted by standard text processing techniques to determine the correlation between a project item and a code check-in a code repository. The code check-in may in turn have its own identifier, which may be tracked as part of the code and build repository to identify which builds the code check-in made into and hence the linked Project item is part of. While unit tests may refer to the code check-in identifier, the regular tests would typically refer to a build identifier. Builds that may get released may be associated with an application version identifier that is used in tools of the configuration process, deployment process and monitoring process. In some embodiments, names may be used for the correlation when the identifier for the project item is absent. For example, the specification may refer to the epic name which may be used for correlating the specification with the project items. For generating the chain of linked identifiers, the software development device 110 is cognizant of the hierarchy that is used in the plurality of distinct software development applications 104A-N, for example, multiple project item identifiers may be part of a code check-in, multiple code check-in's may be part of a build, and from the multiple builds one may be designated for release. The released build may become an application version and over time there may be more releases so there would be multiple application versions.

Figure 5:
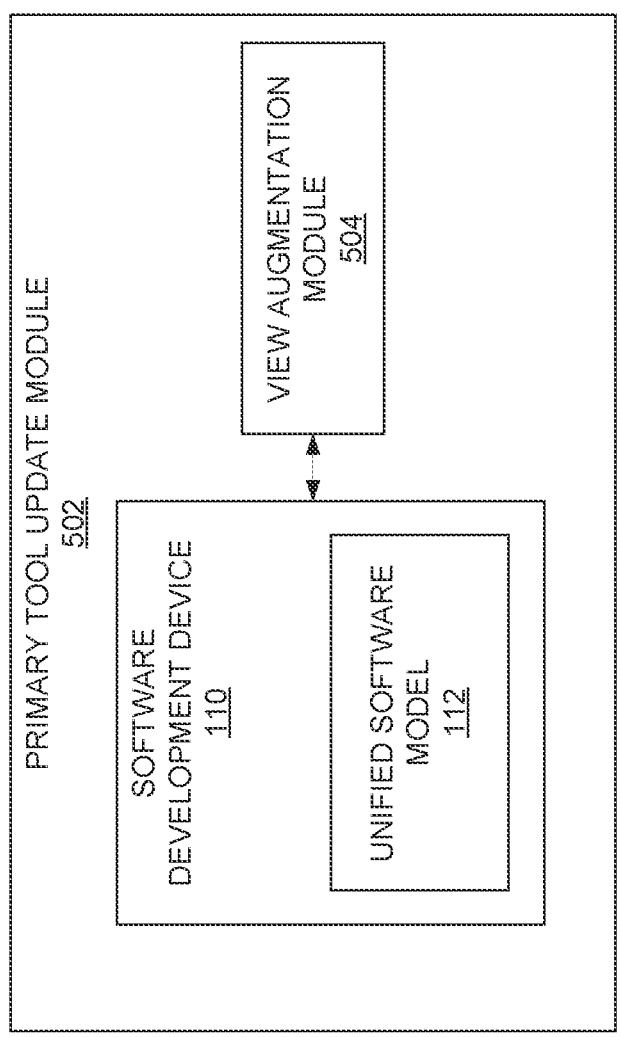
FIG. 5 illustrates a primary tool update module that augments a user interface of a software development application with the unified view, according to some embodiments herein.

FIG. 5 illustrates a primary tool update module 502 that augments a user interface of the distinct software development application 104A with the unified view, according to some embodiments herein. The primary tool update module 502 includes a view augmentation module 504 that is connected with the software development device 110.

The distinct software development application 104A may be a project management application that already tracks a significant subset of the flow of the software development process, due to which the distinct software development application 104A may be selected to be a primary tool of the software development process. The distinct software development application 104A may have a multiple level hierarchy for tracking the software development process, for example, tracking epics, stories, tasks, and sub-tasks. Each item at any level of the hierarchy of the software development process may have a unique item identifier that may be used for referencing the item in the plurality of distinct software development applications 104B-N. Further, each item could be individually linked to repositories of different tools, for example, links to a requirement specification, a functional specification, high level and detail design documents may exist at any level of the hierarchy of the software development process. Similarly, a code check-in, unit test or regular test could relate to any level of the hierarchy of the software development process such as a sub-task, task or epic. A release may typically be associated with highest level of the hierarchy of the software development process, for example, the epic. But there may be releases which just fix an urgent bug so release process, configuration process and deployment process may also be associated with any level of the hierarchy of the software development process. As the monitoring process is associated with the release process and the deployment process, each project item includes the following associated information: (a) a project item name, (b) a priority, (c) an owner, (d) an estimate, (e) a sub-stage, (f) links to requirement specification, functional specification, high level design and detail design, (g) a flag indicating if the item has been secured, (h) flags to indicate if unit testing and regular testing has been performed for the item, and links to functional tests, performance tests and security tests, (i) a flag to indicate if the item has been released and links to releases the item is in, and (j) a flag to indicate if the item has been deployed and links to logs and monitoring information applicable to the item.

One or more transition markers preferably may be used as timestamps for the entry or the exit. The distinct software development application 104A may log every sub-stage and stage change with a timestamp. The timestamps may be propagated to the distinct software development application 104A on every link or information update triggered based on the updates from the plurality of distinct software models 106B-N of the plurality of distinct software development applications 104B-N.

The distinct software development application 104A may be augmented with data feeds or data streams from the plurality of distinct software development applications 104B-N, where data feeds or data streams provide data associated with the stages whose data is not available to the distinct software development application 104A. The distinct software development application 104A may be designed for project planning of the software development process. The distinct software development application 104A may be extended to have one or more links to a requirement specification, a functional specification, high level and detail design documents that reside in a document repository. Optionally, the distinct software development application 104A may be linked to one or more tools such as check-in tools or build management tools that update a status of a feature. The one or more tools may update the status of the feature when there are check-in tools, code securing tools which update status of the feature when they have been secured, and test automation tools which update the status when unit testing and full testing has been performed for the feature. Similarly, when a release has been configured and deployed, information for released items may be updated in the primary tool or the distinct software development application 104A.

To use the generalized webhook system, the distinct software development application 104A may setup subscriptions from the document repository to receive the document title, and a project item identifier if available, when a final version of a document is ready. The distinct software development application 104A may further setup subscriptions to a test automation tool to receive the updates when unit testing or regular testing (functional, performance, stress) has completed for a particular project item. Additionally, the distinct software development application 104A may have subscriptions to the code repository/build tool to receive notifications on check-in's associated with a project item or inclusion of the code in a released build. Flexibility of the generalized webhook system enables the distinct software development application 104A to receive event data from the plurality of distinct software development applications 104B-N in a format that is directly usable by the distinct software development application 104A when specified conditions are met. In an embodiment, traditional mechanisms such as periodic pull, push or use of standard webhooks with brokers for communicating between the plurality of distinct software development applications 104A-N may also be used instead of the generalized webhook system.

The view augmentation module 504 may obtain the unified software model 112 from the software development device 110. Based on the unified software model 112, the view augmentation module 504 may augment the user interface (UI) of the software development application 104A, that may be used for the software development process, with the unified view of the software development process that is generated based on the unified software model 112. In some embodiments, a capability to associate a lowest granularity project item with detailed information about specifications, tests, releases and logs may be provided to the distinct software development application 104A. Considering that releases may just fix an urgent bug which may be the lowest level in the hierarchy of the software development process, for rendering compactness of the user interface (UI) of the distinct software development application 104A, the UI or the unified view 300 as described in FIG. 3 may support a project item indicating that the project item shares one or more of the detailed information attributes with a parent project item, so as to avoid unnecessary repetition of information in the UI or the unified view 300.

Computation of a plurality of software development flow metrics may be based on the entry and exit tracking module 208, the stage reduction module 214 that may be configured to customize a start and an end for a subset of the plurality, and the outcome mapping module 216. Optionally, the computation of the plurality of software development flow metrics may include correlating flow items and stages to other dimensions such as temporal, progress tracking, ownership, and priority, via available attributes.

Figure 6:
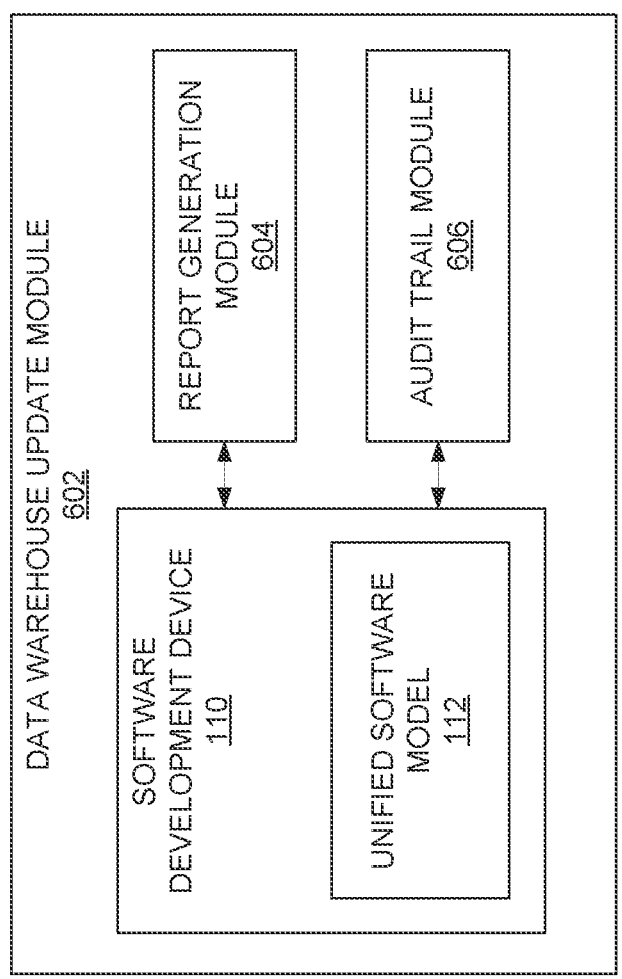
FIG. 6 illustrates a data warehouse update module that stores historical and current data associated with a unified software model of the software development device of FIG. 1, according to some embodiments herein.

FIG. 6 illustrates a data warehouse update module 602 that stores historical and current data associated with a unified software model 112 of the software development device 110 of FIG. 1, according to some embodiments herein. The data warehouse update module 602 may store historical data and current data associated with the unified software model 112 in a data warehouse. The data warehouse update module 602 includes a report generation module 604 and an audit trail module 606. The report generation module 604 may be configured to display the unified view of the software development process via reports or dashboards that are created based on data in the data warehouse. The data warehouse update module 602 may be used if it is not possible to enhance the distinct software development application 104A, or there are some data sources for which creating data feeds to the distinct software development application 104A may require significant work. Unlike the approach where a tool 104A of the software development process is selected to be the primary and augmented with updates from the plurality of remaining software development applications 104B-N, in the data warehouse approach updates from the plurality of distinct software applications 104A-N all go into the central data warehouse. The data warehouse update module 602 enables analysis on the historical data and may be able to utilize multiple available sophisticated business intelligence tools.

One or more transition markers preferably may be used as timestamps for the entry or the exit. The data warehouse update module 602 may retrieve the timestamps and make the timestamps comparable with the aid of a time dimension.

The audit trail module 606 may generate at least one audit trail for tracking activities that span across different stages of the software development process using the data warehouse. For auditability, queries over the historical data maintained in the data warehouse may provide audit trails for tracking activity spanning the different software stages. For example, enumerating changes which went into each release along with who made those changes and when, or which releases were secured, or the deployment history of different releases, or the history of when requirements/customer reported defects came in and when the solutions were provided to customers.

Figure 7B:
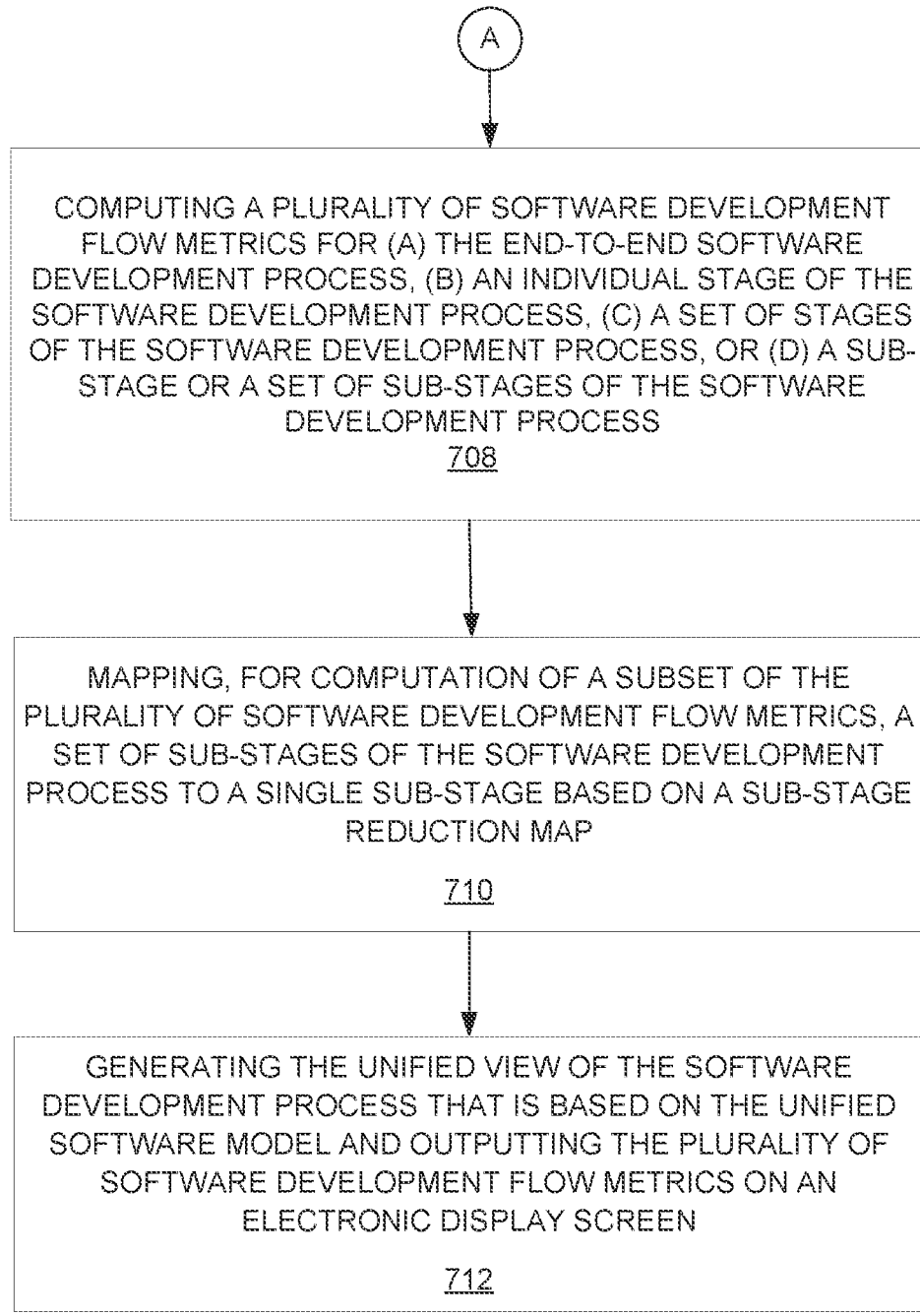

FIGS. 7A and 7B are flow diagrams of a method for generation of a unified view of a software development process that spans a plurality of distinct software development applications 104A-N having distinct software models 106A-N, according to some embodiments herein. At step 702, the method comprises updating a unified software model 112 capturing an end to end software development process with updates obtained from the distinct software models 106A-N of the plurality of distinct software development applications 104A-N associated with different stages of the software development process. At step 704, the method comprises determining a correlation between a plurality of software model entities of the plurality of distinct software models 106A-N of the plurality of distinct software development applications 104A-N that are related, based on use of common identifiers associated with the software model entities. The identifiers are correlated to capture (i) a flow of the software development process, and (ii) hierarchical relationships between the software model entities. At step 706, the method comprises tracking an entry and an exit from each stage and a sub-stage of the software development process by assigning a time-stamp to each update of the plurality of software model entities that is triggered in any of the plurality of distinct software development applications 104A-N. At step 708, the method comprises computing a plurality of software development flow metrics for (i) the end-to-end software development process, (ii) an individual stage of the software development process, (iii) a set of stages of the software development process, or (iv) a sub-stage or a set of sub-stages of the software development process. At step 710, the method comprises mapping, for computation of a subset of the plurality of software development flow metrics, a set of sub-stages of the software development process to a single sub-stage based on a sub-stage reduction map. At step 712, the method comprises generating the unified view of the software development process that is based on the unified software model 112 and outputting the plurality of software development flow metrics on an electronic display screen.

Figure 8:
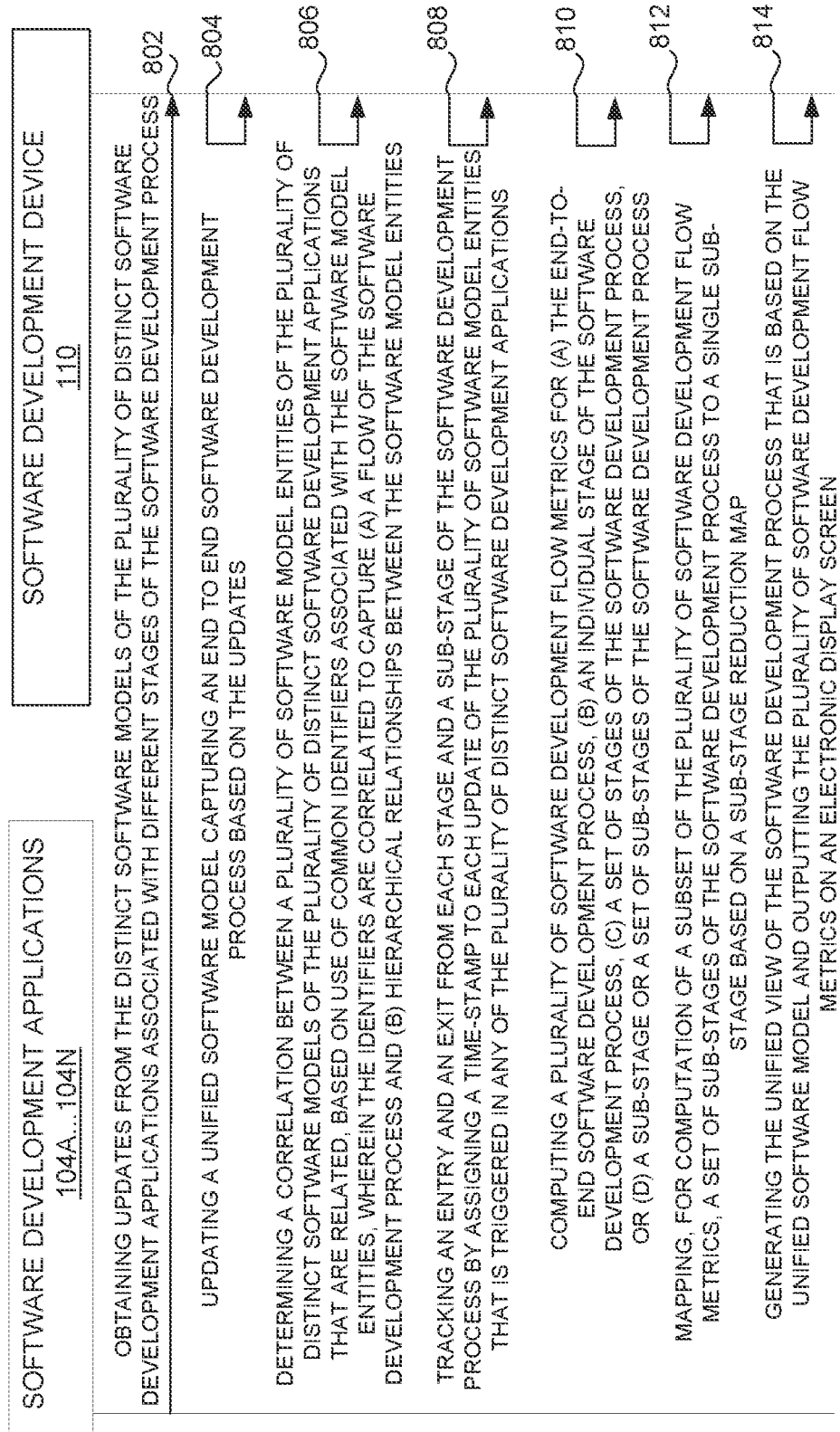
FIG. 8 is an interaction diagram of a method for generation of a unified view of a software development process that spans a plurality of distinct software development applications having distinct software models, according to some embodiments herein.

FIG. 8 is an interaction diagram of a method for generation of a unified view of a software development process that spans a plurality of distinct software development applications 104A-N having distinct software models 106A-N, according to some embodiments herein. At step 802, updates from the distinct software models 106A-N of the plurality of distinct software development applications 104A-N associated with different stages of the software development process are obtained. At step 804, the unified software model 112 capturing an end to end software development process is updated based on the updates. At step 806, a correlation between a plurality of software model entities of the plurality of distinct software models 106A-N of the plurality of distinct software development applications 104A-N that are related is determined, based on use of common identifiers associated with the software model entities. The identifiers may be correlated to capture (a) a flow of the software development process, and (b) hierarchical relationships between the software model entities. At step 808, an entry and an exit from each stage and a sub-stage of the software development process are tracked by assigning a time-stamp to each update of the plurality of software model entities that is triggered in any of the plurality of distinct software development applications 104A-N. At step 810, a plurality of software development flow metrics are computed for (a) the end-to-end software development process, (b) an individual stage of the software development process, (c) a set of stages of the software development process, or (d) a sub-stage or a set of sub-stages of the software development process. At step 812, a set of sub-stages of the software development process are mapped to a single sub-stage based on a sub-stage reduction map for computation of a subset of the plurality of software development flow metrics. At step 814, the unified view of the software development process that is based on the unified software model 112 is generated and the plurality of software development flow metrics are outputted on an electronic display screen.

The various systems and corresponding components described herein and/or illustrated in the figures may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The systems that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU or GPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
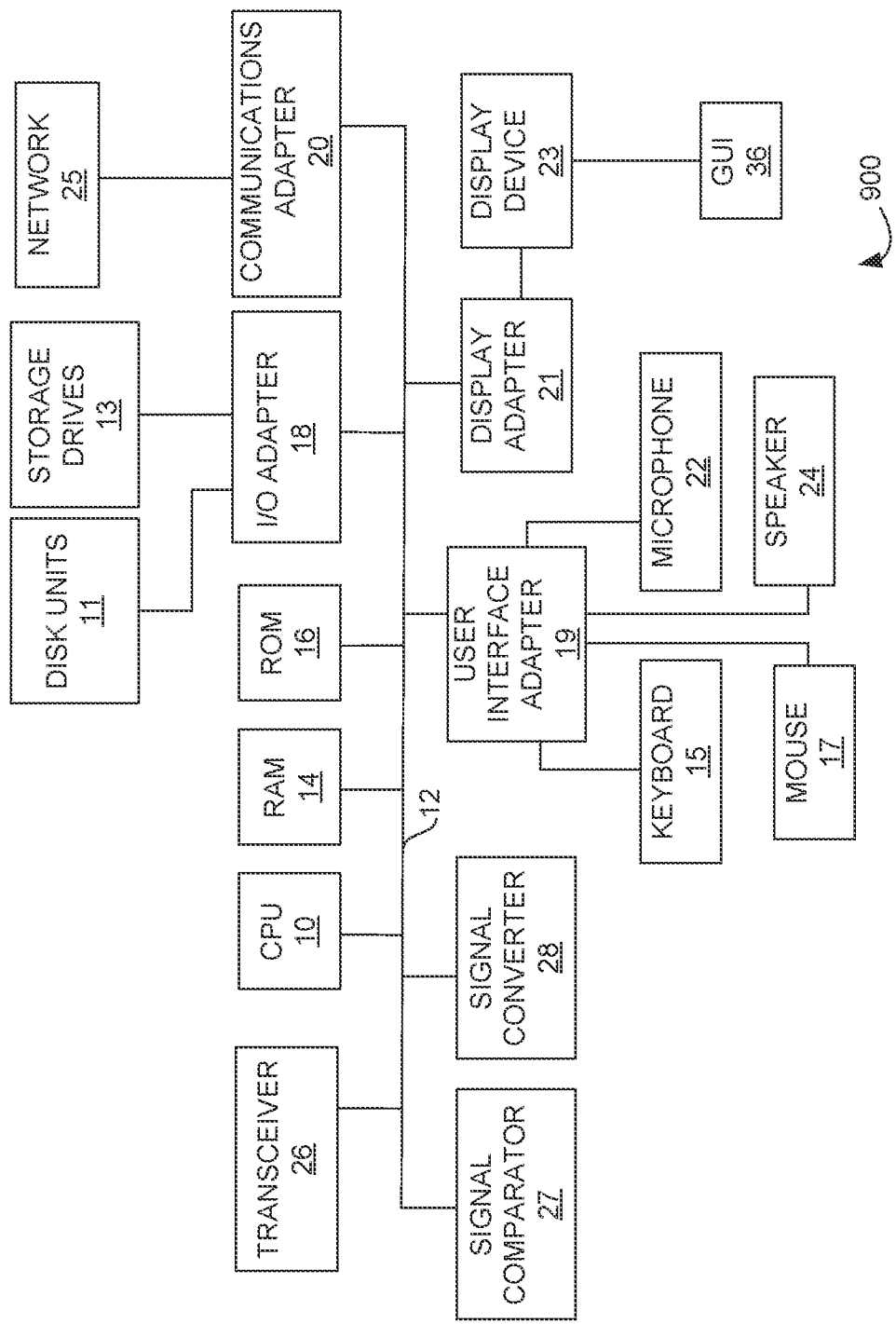
FIG. 9 is a schematic diagram of a computer architecture, in accordance with the embodiments herein.

A representative hardware environment for practicing the embodiments herein is depicted in FIG. 9, with reference to FIGS. 1 through 8. This schematic drawing illustrates a hardware configuration of a software development device/computer system 900 in accordance with the embodiments herein. The system 900 comprises at least one processor or central processing unit (CPU) 10. The CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 900 can read the inventive instructions on the program storage devices and follow these instructions to execute the methodology of the embodiments herein. The system 900 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope.

What is claimed is:

1. A non-transitory computer readable storage medium storing a sequence of instructions, which when executed by a processor, causes generation of a unified view of a software development process that spans a plurality of distinct software development applications having distinct software models, said sequence of instructions comprising:

updating a unified software model capturing an end to end software development process with updates obtained from the distinct software models of the plurality of distinct software development applications associated with different stages of the software development process;

determining a correlation between a plurality of software model entities of the plurality of distinct software models of the plurality of distinct software development applications that are related, based on use of common identifiers associated with the software model entities, wherein the identifiers are correlated to capture (a) a flow of the software development process and (b) hierarchical relationships between the software model entities;

tracking an entry and an exit from each stage and a sub-stage of the software development process by assigning a time-stamp to each update of the plurality of software model entities that is triggered in any of the plurality of distinct software development applications;

computing a plurality of software development flow metrics for (a) the end-to-end software development process, (b) an individual stage of the software development process, (c) a set of stages of the software development process, or (d) a sub-stage or a set of sub-stages of the software development process;

mapping, for computation of a subset of the plurality of software development flow metrics, a set of sub-stages of the software development process to a single sub-stage based on a sub-stage reduction map; and generating the unified view of the software development process that is based on the unified software model and outputting the plurality of software development flow metrics on an electronic display screen.

2. The non-transitory computer readable storage medium storing the sequence of instructions of claim 1, which when executed by the processor, further causes aligning the unified software model and the plurality of distinct software development applications to capture updates of the plurality of software model entities associated with the plurality of distinct software development applications based on at least one of a webhook system, a push of updates from the plurality of distinct software development applications or a pull of updates from the plurality of distinct software development applications.

3. The non-transitory computer readable storage medium storing the sequence of instructions of claim 1, which when executed by the processor, further causes extracting the identifier of the plurality of software model entities from a text attribute associated with the plurality of software model entities using a text analysis method.

4. The non-transitory computer readable storage medium storing the sequence of instructions of claim 1, which when executed by the processor, further causes customizing a start and an end for a subset of the plurality of software development flow metrics, wherein the start and the end is a stage or a sub-stage of the software development process.

5. The non-transitory computer readable storage medium storing the sequence of instructions of claim 1, which when executed by the processor, further causes augmenting a user interface of a software development application used for the software development process, with the unified view of the software development process that is generated based on the unified software model.

6. The non-transitory computer readable storage medium storing the sequence of instructions of claim 1, which when executed by the processor, further causes:
storing historical and current data associated with the unified software model in a data warehouse; and
displaying the unified view of the software development process via reports or dashboards created based on data in the data warehouse.

7. The non-transitory computer readable storage medium storing the sequence of instructions of claim 6, which when executed by the processor, further causes determining a dimensional correlation between the stages of the software development process and a plurality of dimensions of the plurality of software model entities that includes at least one of a temporal dimension, a progress dimension, an ownership dimension, a priority dimension or a software flow stage dimension.

8. The non-transitory computer readable storage medium storing the sequence of instructions of claim 7, which when executed by the processor, further causes analysis of the plurality of software development flow metrics based on the plurality of dimensions.

9. The non-transitory computer readable storage medium storing the sequence of instructions of claim 6, which when executed by the processor, further causes generating at least one audit trail for tracking activities that span across different stages of the software development process.

10. The non-transitory computer readable storage medium storing the sequence of instructions of claim 1, which when executed by the processor, further causes maintaining of a map between the software development process against business outcomes and a plurality of business stages, to support scoping the plurality of software development flow metrics to business outcomes and the plurality of business stages.

11. A software development device that causes generation of a unified view of a software development process that spans a plurality of distinct software development applications having distinct software models, the device comprising:
a processor; and
a memory that stores a set of instructions, which when executed by the processor, performs:
updating a unified software model capturing an end to end software development process with updates obtained from the distinct software models of the plurality of distinct software development applications associated with different stages of the software development process;
determining a correlation between a plurality of software model entities of the plurality of distinct software models of the plurality of distinct software development applications that are related, based on use of common identifiers associated with the software model entities, wherein the identifiers are correlated to capture (a) a flow of the software development process and (b) hierarchical relationships between the software model entities;
tracking an entry and an exit from each stage and a sub-stage of the software development process by assigning a time-stamp to each update of the plurality of software model entities that is triggered in any of the plurality of distinct software development applications;
computing a plurality of software development flow metrics for (a) the end-to-end software development process, (b) an individual stage of the software development process, (c) a set of stages of the software development process, or (d) a sub-stage or a set of sub-stages of the software development process;
mapping, for computation of a subset of the plurality of software development flow metrics, a set of sub-stages of the software development process to a single sub-stage based on a sub-stage reduction map; and
generating the unified view of the software development process that is based on the unified software model and outputting the plurality of software development flow metrics on an electronic display screen.

12. The software development device of claim 11, wherein the software development device aligns the unified software model and the plurality of distinct software development applications to capture updates of the plurality of software model entities associated with the plurality of distinct software development applications based on at least one of a webhook system, a push of updates from the plurality of distinct software development applications or a pull of updates from the plurality of distinct software development applications.

13. The software development device of claim 11, wherein the software development device customizes a start and an end for a subset of the plurality of software development flow metrics, wherein the start and the end are a stage or a sub-stage of the software development process.

14. The software development device of claim 11, wherein the software development device augments a user interface of a software development application used for the software development process, with the unified view of the software development process that is generated based on the unified software model.

15. The software development device of claim 11, wherein the software development device stores historical and current data associated with the unified software model in a data warehouse and displays the unified view of the software development process via reports or dashboards created based on data in the data warehouse.

16. The software development device of claim 15, wherein the software development device determines a dimensional correlation between the stages of the software development process and a plurality of dimensions of the plurality of software model entities that includes at least one of a temporal dimension, a progress dimension, an ownership dimension, a priority dimension or a software flow stage dimension.

17. The software development device of claim 16, wherein the software development device causes analysis of the plurality of software development flow metrics based on the plurality of dimensions.

18. The software development device of claim 15, wherein the software development device generates at least one audit trail for tracking activities that span across different stages of the software development process.

19. The software development device of claim 11, wherein the software development device maintains a map between the software development process against business outcomes and a plurality of business stages, to enable scoping the plurality of software development flow metrics to business outcomes and the plurality of business stages.

20. A method of generation of a unified view of a software development process that spans a plurality of distinct software development applications having distinct software models, the method comprising:
updating a unified software model capturing an end to end software development process with updates obtained from the distinct software models of the plurality of distinct software development applications associated with different stages of the software development process;
determining a correlation between a plurality of software model entities of the plurality of distinct software models of the plurality of distinct software development applications that are related, based on use of common identifiers associated with the software model entities, wherein the identifiers are correlated to capture (a) a flow of the software development process and (b) hierarchical relationships between the software model entities;
tracking an entry and an exit from each stage and a sub-stage of the software development process by assigning a time-stamp to each update of the plurality of software model entities that is triggered in any of the plurality of distinct software development applications;
computing a plurality of software development flow metrics for (a) the end-to-end software development process, (b) an individual stage of the software development process, (c) a set of stages of the software development process, or (d) a sub-stage or a set of sub-stages of the software development process;
mapping, for computation of a subset of the plurality of software development flow metrics, a set of sub-stages of the software development process to a single sub-stage based on a sub-stage reduction map; and
generating the unified view of the software development process that is based on the unified software model and outputting the plurality of software development flow metrics on an electronic display screen.

21. The method of claim 20, further comprising aligning the unified software model and the plurality of distinct software development applications to capture updates of the plurality of software model entities associated with the plurality of distinct software development applications based on at least one of a webhook system, a push of updates from the plurality of distinct software development applications or a pull of updates from the plurality of distinct software development applications.

22. The method of claim 20, further comprising extracting the identifier of the plurality of software model entities from a text attribute associated with the plurality of software model entities using a text analysis method.

* * * * *